(12) United States Patent
Van Oost et al.

(10) Patent No.: US 10,862,789 B2
(45) Date of Patent: Dec. 8, 2020

(54) METHOD FOR TESTING A WIRELESS LINK OF A WI-FI NODE, AND CIRCUIT PERFORMING THE METHOD

(71) Applicant: AIRTIES BELGIUM SPRL, Woluwe-Saint-Lambert (BE)

(72) Inventors: Koen Van Oost, Borsbeek (BE); Karel Van Doorselaer, Edegem (BE)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 0 days.

(21) Appl. No.: 15/025,279

(22) PCT Filed: Sep. 26, 2014

(86) PCT No.: PCT/EP2014/070615
§ 371 (c)(1),
(2) Date: Mar. 27, 2016

(87) PCT Pub. No.: WO2015/044343
PCT Pub. Date: Apr. 2, 2015

(65) Prior Publication Data
US 2016/0226740 A1 Aug. 4, 2016

(30) Foreign Application Priority Data

Sep. 27, 2013 (EP) ..................... 13306337
Nov. 27, 2013 (EP) ..................... 13306623

(51) Int. Cl.
*H04L 1/00* (2006.01)
*H04L 12/26* (2006.01)
(Continued)

(52) U.S. Cl.
CPC .......... *H04L 43/0894* (2013.01); *H04L 43/16* (2013.01); *H04W 24/06* (2013.01);
(Continued)

(58) Field of Classification Search
None
See application file for complete search history.

(56) References Cited

U.S. PATENT DOCUMENTS 5,802,473 A 9/1998 Rutledge et al.
5,896,561 A * 4/1999 Schrader ............... H04L 1/0025
370/445
(Continued)

FOREIGN PATENT DOCUMENTS

CN 1574776 2/2005
CN 102932895 A 2/2013
(Continued)

OTHER PUBLICATIONS

Bernstein et al., CPE WAN Management Protocol, DSL Forum, Technical Report, TR-069, pp. 1-109 (May 2004).
(Continued)

*Primary Examiner* — Bob A Phunkulh
(74) *Attorney, Agent, or Firm* — Volpe and Koenig, P.C.

(57) ABSTRACT

A method and a system for monitoring a wireless link of a wireless node of a CPE device during operation of the CPE device are provided, For example, the method comprises taking samples of one or several of the following parameters in a defined time interval: Received Signal Strength (RSSI), modulation rate (Physical Layer Rate) and/or the number of spatial streams used for the wireless link, and calculating an average for the one or several of the parameters by including a filtering of the one or several of the parameters.

18 Claims, 7 Drawing Sheets

(51) Int. Cl.
   *H04W 24/06* (2009.01)
   *H04W 24/08* (2009.01)
   *H04W 84/12* (2009.01)
(52) U.S. Cl.
   CPC ............ *H04W 24/08* (2013.01); *H04L 43/12* (2013.01); *H04W 84/12* (2013.01)

(56) References Cited

U.S. PATENT DOCUMENTS

| | | | | |
|---|---|---|---|---|
| 5,974,106 | A * | 10/1999 | Dupont | H04L 1/0002 375/377 |
| 6,760,882 | B1 * | 7/2004 | Gesbert | H04L 1/0016 370/252 |
| 6,973,059 | B1 * | 12/2005 | Borst | H04B 1/7136 370/330 |
| 7,006,447 | B1 * | 2/2006 | Vaisanen | G01R 31/319 370/252 |
| 2004/0017790 | A1 * | 1/2004 | del Prado | H04W 28/22 370/333 |
| 2004/0246937 | A1 | 12/2004 | Duong et al. | |
| 2005/0026624 | A1 * | 2/2005 | Gandhi | H04W 28/12 455/453 |
| 2006/0187885 | A1 * | 8/2006 | Roy | H04L 1/0015 370/332 |
| 2007/0037601 | A1 * | 2/2007 | Mittal | H04W 24/10 455/525 |
| 2007/0206695 | A1 * | 9/2007 | Ye | H04L 1/0003 375/267 |
| 2007/0207824 | A1 * | 9/2007 | Bhattacharjee | H04W 24/10 455/513 |
| 2008/0192724 | A1 * | 8/2008 | Kondo | H04L 47/10 370/345 |
| 2010/0041349 | A1 * | 2/2010 | Mahany | H04W 74/06 455/88 |
| 2010/0135320 | A1 * | 6/2010 | Tu | H04W 28/22 370/468 |
| 2010/0183087 | A1 * | 7/2010 | Hosokawa | H04B 7/0848 375/262 |
| 2010/0278158 | A1 | 11/2010 | Lee et al. | |
| 2010/0316036 | A1 * | 12/2010 | Jeyaseelan | H04W 36/30 370/338 |
| 2011/0002295 | A1 | 1/2011 | Ghosal et al. | |
| 2011/0170443 | A1 * | 7/2011 | Murias | H04W 40/28 370/252 |
| 2011/0182383 | A1 * | 7/2011 | Ponnuswamy | H04B 17/327 375/316 |
| 2012/0287797 | A1 | 11/2012 | Basson et al. | |
| 2013/0039212 | A1 * | 2/2013 | Li | H04W 52/0245 370/253 |
| 2013/0100928 | A1 * | 4/2013 | Matsumori | H04W 36/24 370/331 |
| 2013/0102309 | A1 * | 4/2013 | Chande | H04W 52/244 455/435.1 |
| 2013/0165134 | A1 * | 6/2013 | Touag | H04W 72/0486 455/452.1 |
| 2014/0022932 | A1 * | 1/2014 | Park | H04W 36/14 370/253 |
| 2014/0220960 | A1 * | 8/2014 | Nagel | H04W 24/10 455/419 |

FOREIGN PATENT DOCUMENTS

| | | |
|---|---|---|
| EP | 0713632 | 1/2002 |
| WO | WO2012110442 | 8/2012 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

Lupton et al., Device Data Model for TR-069, Broadband Forum, Technical Report, TR-181, pp. 1-88 (Feb. 2011).

Chinese Office Action issued in corresponding application CN201480052710.7, dated Oct. 29, 2018.

\* cited by examiner

| 802.11 Standard | MIMOConfig | 20 MHz Enabled | 20 MHz+SGI Enabled | 40 MHz Enabled | 40 MHz+SGI Enabled |
|---|---|---|---|---|---|
| 802.11b | 1 x 1 : 1 | 11 | NA | NA | NA |
| 802.11g | 1 x 1 : 1 | 54 | NA | NA | NA |
| 802.11n | 1 x 1 : 1 | 65 | 72.2 | 135 | 150 |
| 802.11n | 2 x 2 : 2 | 130 | 144.4 | 270 | 300 |
| 802.11n | 3 x 3 : 3 | 195 | 216.7 | 405 | 450 |
| 802.11n | 4 x 4 : 4 | 260 | 288.9 | 540 | 600 |

Fig. 5

METHOD FOR TESTING A WIRELESS LINK OF A WI-FI NODE, AND CIRCUIT PERFORMING THE METHOD

This application claims the benefit, under 35 U.S.C. § 365 of International Application PCT/EP2014/070615, filed Sep. 26, 2014, which was published in accordance with PCT Article 21(2) on Apr. 2, 2015 in English and which claims the benefit of European Patent Application No. 13306337.0, filed Sep. 27, 2013 and European Patent Application No. 13306623.3, filed Nov. 27, 2013.

TECHNICAL FIELD

The invention relates to the field of wireless nodes and respective devices communicating with each other via a wireless communication.

BACKGROUND OF THE INVENTION

Access gateways are widely used to connect devices a the home to the Internet or any other wide area network (WAN). Access gateways use in particular digital subscriber line (DSL) technology that enables a high data rate transmission over copper lines or optical lines. Residential gateways, but also other devices such as routers, switches, telephones and set-top boxes, are understood in this context as customer premises equipment (CPE) devices.

Access gateways including wireless technology have a key role in today's home and professional environments. A mechanism for connecting wireless devices to a local area network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station (denoted as STA) and a special type of a STA that is in control of the network, namely an access point (denoted AP). A Wi-Fi network, often called a WLAN (wireless local area network), consists of an AP with one or several STA connected to the AP.

Due to its flexible and "invisible" nature, a lot of LAN applications are utilizing Wi-Fi rather than the classical wired Ethernet approach. This widespread usage of wireless LAN has exposed however a serious downside of using a shared medium technology: interference. Interference, both Wi-Fi and non-Wi-Fi related, leads to a degraded user experience due to the nature of IEEE 802.11. In its most common form, IEEE 802.11 networks apply a medium access method in which collisions are avoided by sensing that the medium is used (denoted as CSMA-CA). The medium access method is also commonly known as "listen before talk", describing the essence of the method. Interference from any nature can hence block the medium and force all nodes to remain silent.

A further technique that may be used to avoid interference is referred to as "Clear Channel Assessment" (CCA). Clear channel assessment determines whether a wireless communication channel is "occupied", e.g., "busy" with another wireless communication and/or has an amount of interference that makes the wireless communication channel unsuitable for communication. In this way, it is determined whether the wireless communication channel is available or not available for communication, e.g. occupied or not occupied.

Another impact of interference can be packet loss at the receiver side, leading to a reduction of the physical data rate. In this case, the interference is not detected by the CCA of the transmitter, but is decreasing the SINR (Signal to Noise and Interference Ratio) of the Wi-Fi packets as seen by the receiver.

Therefore, in certain circumstances, the Wi-Fi connection can suffer from poor performance and even connection loss. Some of these circumstances are obvious and easy to explain to an end user. For example, if the distance between the station and the access point is too large, then signal levels are low and performance will degrade. Other circumstances are "invisible" and not understood by the end user, e.g. a hidden node. A hidden node is invisible to some of the nodes of a network, leading to a practical failure of the CSMA-CA method, which can cause packet collision/corruption over air. In many cases, the end user is not able to diagnose the problem source and correct the issue.

In-home Wi-Fi network connectivity is correspondingly one of the main Internet service provider support costs and causes for help-desk calls. Today's focus for operators is mainly on Wi-Fi network installation, associating a station with an access point. Internet service providers are therefore searching for ways to get a better understanding of the end user's wireless environment including link quality and performance.

Related to Wi-Fi performance, operators can use a remote management protocol such as Broadband Forum (noted BBF) TR-069 protocol, which provides access to Wi-Fi parameters as defined in the Internet Gateway Device data model BBF TR-181. But the information available via TR-069 is very limited and focused on data traffic. In some cases, an end user is faced with an issue preventing Wi-Fi connection at all, correspondingly rendering TR-069 monitoring useless. Hence, when an end user calls a help-desk, it can be a lengthy and expensive process to describe the home topology and diagnose the issue at hand.

The ideal way to analyze Wi-Fi issues, e.g. connection setup, interference, throughput, . . . , is by looking into the master node of the wireless LAN, namely the AP. The AP, as defined in IEEE 802.11, controls the network, hence all data and network control must be visible by the AP. The AP today can deliver statistics regarding packet transmission and signal levels, but only if a link between the AP and a STA can be established. The real issue why a link is dropped or why throughput is low, remains hidden to the internals of the AP. Full packet inspection is not possible, hence leaving technology or protocol analyzers in the dark when it comes down to pinpointing the real issues in a wireless LAN. Today, at best an AP can deliver statistics but no view on what is actually happening in the wireless network.

Wi-Fi performance can be degraded because of the following categories. For each category, a different action has to be taken to improve things:
  Power Save settings of the Station
    Change power save setting of the station
  Sharing the medium (properly) with other Wi-Fi devices
    Use another channel that is less occupied (or prioritize Wi-Fi traffic properly using e.g. Wi-Fi Multimedia priorities (WMM, IEEE 802.11e)
  Interference at Transmitter side
    Change to channel without interference (or remove interference source)
  Interference at Receiver side
    Change to channel without interference (or remove interference source)
  Physics: high path loss, impossibility to set up multiple spatial streams
    move AP or Station The problem to solve is to have an application that can correctly analyze Wi-Fi performance issues and indicate the correct category causing the issue, so that the end user can be guided to a suitable corrective action.

SUMMARY OF THE INVENTION

The methods described rely on the availability of correct statistics related to the quality of the Wi-Fi link, such as but not limited to Signal Strength (RSSI) as well as of the Modulation rate (Physical Rate) and the number of Spatial Streams used for a given Wi-Fi link. It is not a trivial task to obtain the correct statistics, as there are power save mechanisms in place that influence the above mentioned parameters in such a way that they cannot be used as such to understand the quality of the Wi-Fi link. E.g. a Wi-Fi implementation can reduce the number of spatial streams and/or the modulation rate to reduce power consumption— rather than in reaction to interference which would prohibit the use of multiple spatial streams and/or of higher modulation rates.

When doing an active test—i.e. forcing traffic through the Wi-Fi link, most implementations will abandon these power-save actions, and a normal averaging of the above-mentioned parameters will provide—in most cases—accurate statistics that yield a correct quality assessment of the Wi-Fi link. In case of Wi-Fi quality monitoring, however, such an active test is to be avoided. So for such passively monitoring tools, a way was found to collect adequate statistics that can avoid power save artefacts.

The monitoring method takes samples of the above-mentioned parameters on a short time scale, e.g. every second. Rather than taking just the average of the samples taken over a certain interval, (averaging is certainly needed to obtain reliable results), a "filtered average" is used. This means that only those samples are retained for calculating the average that are taken at moment when sufficient traffic is flowing over the link. This can be deduced from the TxRate and RxRate parameters that are also sampled every second. By taking the correct threshold of TxRate and/or RxRate, the "filtered average" can avoid the artefacts caused by power save mechanisms, and ensure that only correctly "trained" values of the relevant parameters such as PhyRate, RSSI, and number of spatial streams are considered.

BRIEF DESCRIPTION OF THE DRAWINGS

Preferred embodiments of the invention are explained in more detail below by way of example with reference to schematic drawings, which show.

DESCRIPTION OF PREFERRED EMBODIMENTS

In the following description, example methods for monitoring or analyzing a wireless (Wi-Fi) link of a wireless node of an access point, e.g. a customer-premises equipment device, or a station are described, as well as respective circuits performing the methods. For purposes of explanation, various specific details are set forth in order to provide a thorough understanding of preferred embodiments. It will be evident, however, to one skilled in the art that the present invention may be practiced without these specific details.

A customer premises equipment (CPE) device includes for example a controller, e.g. a microprocessor, a non-volatile memory, in which an operating system is stored, a volatile memory for the operation of the CPE device, a wireless node for a wireless operation, and a broadband connection, e.g. an xDSL connection. The wireless node includes a complex software driver, a physical layer with data buffers, and an antenna. A CPE device of this kind is for example an access gateway, e.g. a residential gateway, which has a central position within a wireless local area network (WLAN).

The wireless node is controlled by the software driver which executes a lot of background tasks during operation of the wireless node, e.g. dynamic rate adaptation, packet aggregation, channel quality monitoring, to name some. On top of signal manipulations, the wireless driver also embeds the IEEE 802.11 protocol stack with the associated IEEE defined management and control messaging. The wireless driver will hence inject a lot of management and control packets in the data stream, making it impossible to analyze a link by transparently looking at the data frame exchange only.

Figure 1:
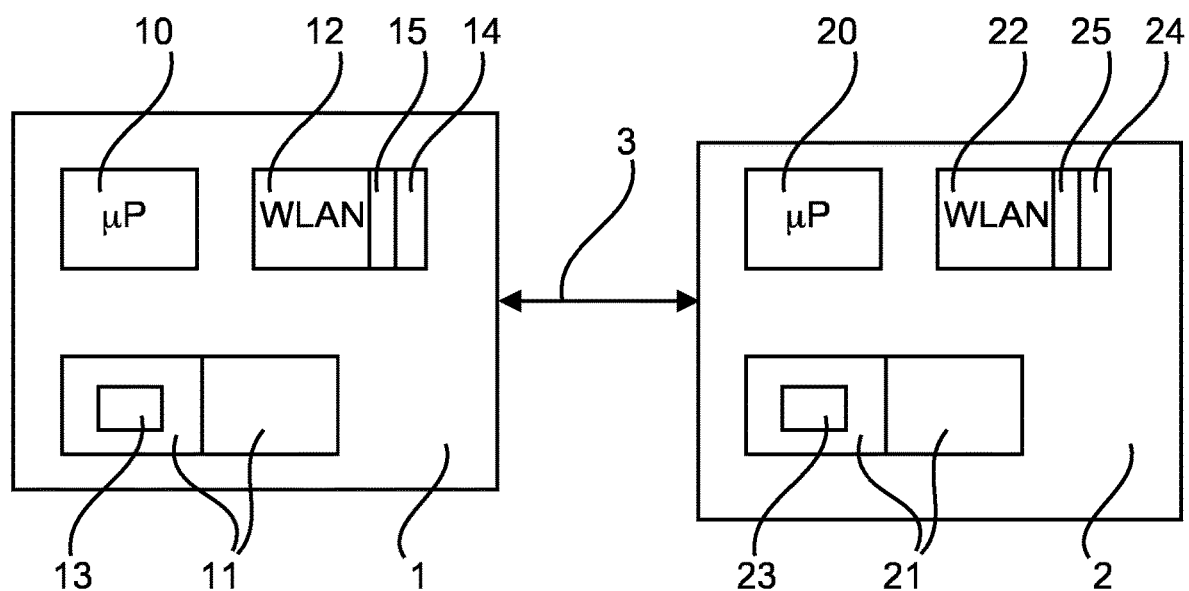
FIG. 1 an access point communicating with a station via a wireless communication, FIG. 2 data rates of a wireless communication according to FIG. 1, FIG. 3 a test application including a coordinator for an active test and a monitor for a passive test, FIG. 4 a performance data rate as a function of RSSI in dBm, FIG. 5 a table showing maximum available data rates for IEEE standards 802.11b, 802.11g and 802.11n, FIG. 6 data rates being obtained by applying FIG. 4 to a wireless transmission according to IEEE 802.11n with a 20 MHz channel bandwidth and two spatial streams, and FIG. 7 test results being displayed on a display as consecutive blocks forming a semi-circle.

A use case is schematically depicted in FIG. 1: An access point 1 communicates with a station 2 via a wireless communication 3. The access point 1 includes a circuit comprising a microprocessor 10, a volatile and a non-volatile memory 11, a wireless node 12 for the wireless communication, and a test application 13. The station 2 includes a second circuit comprising a microprocessor 20, a volatile and a non-volatile memory 21, a wireless node 22 for the wireless communication, and a test application 23. The wireless node 12 includes a physical layer 14 and a link layer 15, and the Wi-Fi node 22 includes a physical layer 24 and a link layer 25.

The test application 13 comprises instructions for the microprocessor 10 and the test application 23 comprises instructions for the microprocessor 20, which are included for diagnosing the wireless communication 3 and which gather an information set about the wireless communication 3. The information set includes in particular achievable data rate, physical layer data rate, multiple spacial streams, channel bandwidth, medium availability and Received Signal Strength Indicator (RSSI). Test data can be gathered in a passive mode, in which a data transmission is monitored between the access point 1 and the station 2 or vice versa, or in an active mode, in which a data transmission is forced between the access point 1 and the station 2.

Figure 2:
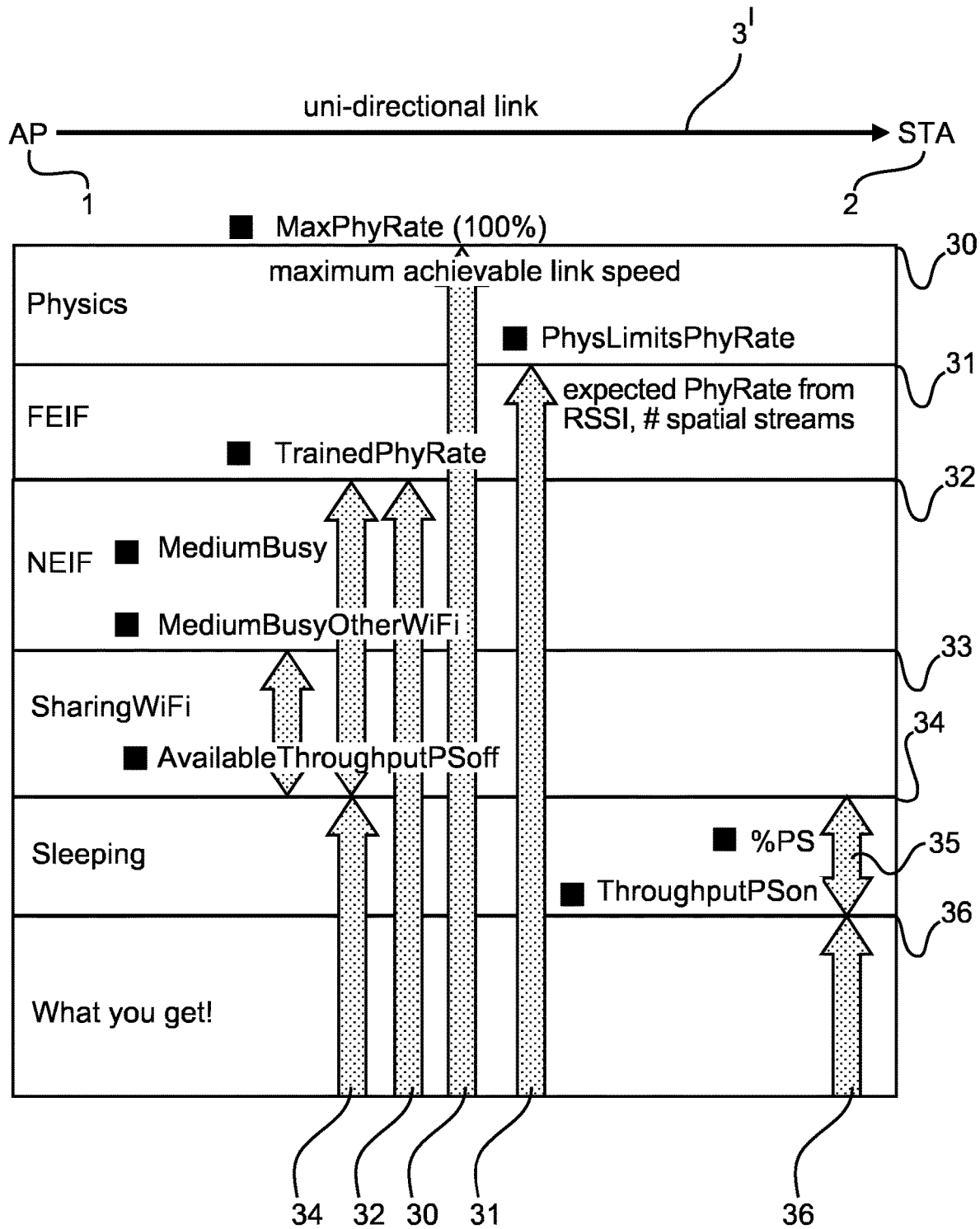

FIG. 2 illustrates the possibilities which have to be considered when diagnosing the Wi-Fi performance between the access point 1 and the station 2. An unidirectional link 3' from the access point 1 to the station 2 is examined. The theoretical maximum data rate 30 for this link is given by the capabilities of the access point 1 and the station 2, called here MaxNegotiatedPhyRate or MaxPhyRate, which is for example 130 MB/s in case an IEEE 802.11n standard with 20 MHz channel bandwidth and two spatial streams is selected for the transmission between the access point 1 and the station 2. This is thus the maximum achievable link speed, 100%, which is only a theoretical value, because for most situations physical limitations come into play: the received signal strength RSSI at the station side is reduced for example due to the distance between the access point 1 and the station 2 and path loss due to any walls or other obstacles and reflections. Also the number of spatial streams has to be determined. The practically attainable data rate 31, called here PhysLimitsPhyRate, is therefore less than the data rate 30.

Further performance can be lost due to interference close to the station 2, which is not seen by the access point 1, called here far end interference FEIF: this can be any microwave source like RF Babyphone, microwave oven or a hidden Wi-Fi node, and leads to a further reduced data rate, called here TrainedPhyRate 32. Similar interference can appear at the access point 1, called here near end interference FEIF: This will reduce the available data rate 32 to a data rate 33, MediumBusyOtherWiFi. Further performance can be lost by sharing the medium with other Wi-Fi traffic, which can be caused by WLAN traffic in the home network, but also by Wi-Fi traffic of a neighboring network. This reduced data rate 34 is called here AvailableThroughputPSoff. Another reduction of the data rate can be caused by performance lost due to a power save mode, for example implemented in a mobile device, e.g. a smartphone. Some percentage of its time, the station 2 may be in a sleeping mode, called her %PS 35. The final data rate 36, what a user can get as the real data rate from the access point 1 to the station 2 is called ThroughputPSon 36.

In order to monitor the data traffic of the physical layer, the layer 1 of the OSI (Open Systems Interconnection Model) model, the traffic that is transmitted and received by the Wi-Fi node of the residential gateway, the residential gateway includes a test application receiving all received and transmitted packets. The test application has access to the following blocks:

Transmit (TX) packet queue, TX packets
Receive (RX) packet queue, RX packets
Transmit/Receive signal indicators (RSSI)

Figure 3:
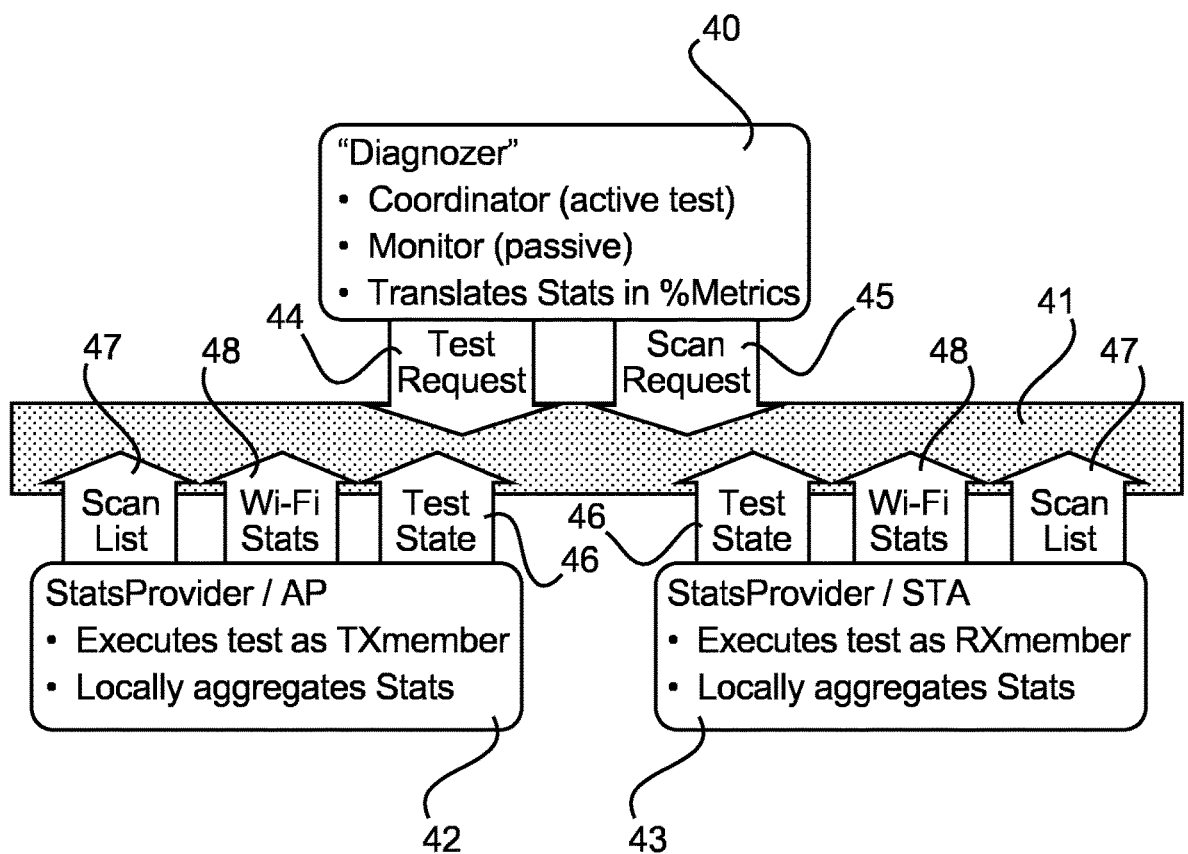

The test application is illustrated in FIG. 3 as a "Diagnozer" 40, which is a coordinator for an active test and a monitor for a passive test, and converts received data in percentages and link speeds and presents the results to a user. The test application 40 is connected via a data bus 41 with a statistics provider application 42 included in the access point 1 and a statistics provider 43 included in the station 2. The data bus 41 uses for example a publish/subscribe messaging system for an exchange of control commands and data with the statistics providers 42 and 43, which is independent of the operating system of the station 2.

The test application 40 requests a test request 44 or a scan request 45, which are submitted via the data bus 41 to the statistics providers 42, 43. The test request 44 can be a passive monitoring test or an active test. Via the scan request 45, lists with recognized neighboring WLAN nodes are requested from the access point 1 and/or station 2. The statistics providers 42, 43 receive the test state information 46 of the test request 44 and provide, when required, scan list 47, which includes all neighboring WLAN nodes being recognized when the access point 1 and/or station 2 scan the WLAN channels, and "Wi-Fi Stats", measured data rates 48, being obtained by the tests.

The data transmitted from the transmit member, access point 1, include in particular measured data rates: MaxPhyRate 31, PhysLimitsPhyRate 31, TrainedPhyRate 32, MediumBusy, MediumBusyOtherWi-Fi 33, %PS 35, ThroughputPSon 36, etc. The data transmitted by the statistics provider 43, the receive member, include in particular RSSI and the scan list.

The test request 44 is published via the data bus 41 by the test application 40 and includes a test identification number (TestRequest.id), MAC addresses of receive member and transmit member, (sourceMAC, destinationMAC), test type: ping or layer 2 test, configuration, etc. The test can be a normal test, in which the receive member is a statistics provider and publishes for example station statistics to the test application 40. The test can be also a blind test, in which the receive member is an associated station not providing any statistics, and the transmit member executes a test autonomously. In this case, the test application 40 can use information only from the access point 1, the transmit member. The scan request 45 is an event and published by the test application 40. The scan list 47 is a state and is published by everyone having subscribed to the scan request 45.

For the statistics being provided by an active test, the test measurements are synchronized between the access point 1 and the station 2. For a passive monitoring, synchronization is not required.

The statistics providers 42, 43 publish locally aggregated statistics via the data bus 41, for example every 30 sec in case of passive monitoring, except when interrupted by an active test. In case of passive monitoring, the station 2 samples RSSI and receive data rates every second and calculates a filtered RSSI average over the tests duration, for example 30 sec. The filtering includes for example a threshold of 1 kbps, and RSSI samples are dropped if the receive data rate is below the threshold. The RSSI samples are aggregated, when the receive data rate is above that threshold.

For the passive monitoring, it is further important to separate issues at the receiver side from CCA (Clear Channel Assessment) related issues. There the fact can be used that the rate adaptation algorithm in any WLAN node aims at reducing packet loss by stepping down to lower modulation rates and less spatial streams. If we define "TrainedPhyRate" 32 as the modulation rate that is used when the link is trained, we can approximatively assume that problems on receive side/packet loss is minimal at this physical layer rate.

Further performance loss can be caused by the CCA mechanism blocking the transmitter to send packets. This can be assessed by using the CCA statistics: medium busy/medium busy other Wi-Fi 33. Actual available performance can be assessed through CCA statistics and knowledge of TrainedPhyRate 32, or through an active test. This is known to those skilled in the art.

Medium sharing: WLAN is using a shared medium concept based on a CSMA-CA (Carrier Sense Multiple Access/Collision Avoidance) medium access method. Performance will drop if more devices are sharing the medium. More difficult is to distinguish what is causing the problems on receiver side, i.e. interference>please change channel; or physics>please move AP or STA.

Interference: The connection speed drops due to the presence of interference. Instead of SNR (signal to noise ratio), SiNR (signal to interference noise ratio) applies which impacts either the physical layer rate or the medium availability. Physics: The connection speed drops due to SNR degradation and a reduced ability to use multiple spatial streams (MIMO: multiple-input and multiple-output). It is noted that MIMO systems leverage on the ability to use a multitude of spatial streams in order to achieve high link speeds.

The PhysLimitsPhyRate 31, FIG. 2, can be understood as the boundary between performance lost due to physical effects ("physics") and performance lost due to interference at the receiver side. PhysLimitsPhyRate 31 is partly defined by extrapolating what physical layer rate would be used in case of the measured signal strength (RSSI)—in the absence of interference. This extrapolation may be based for example on reference measurements in a clean environment—this can be in a conducted set up or in a radiated set up. This covers performance lost due to high path loss, leading to a low signal strength.

Figure 4:
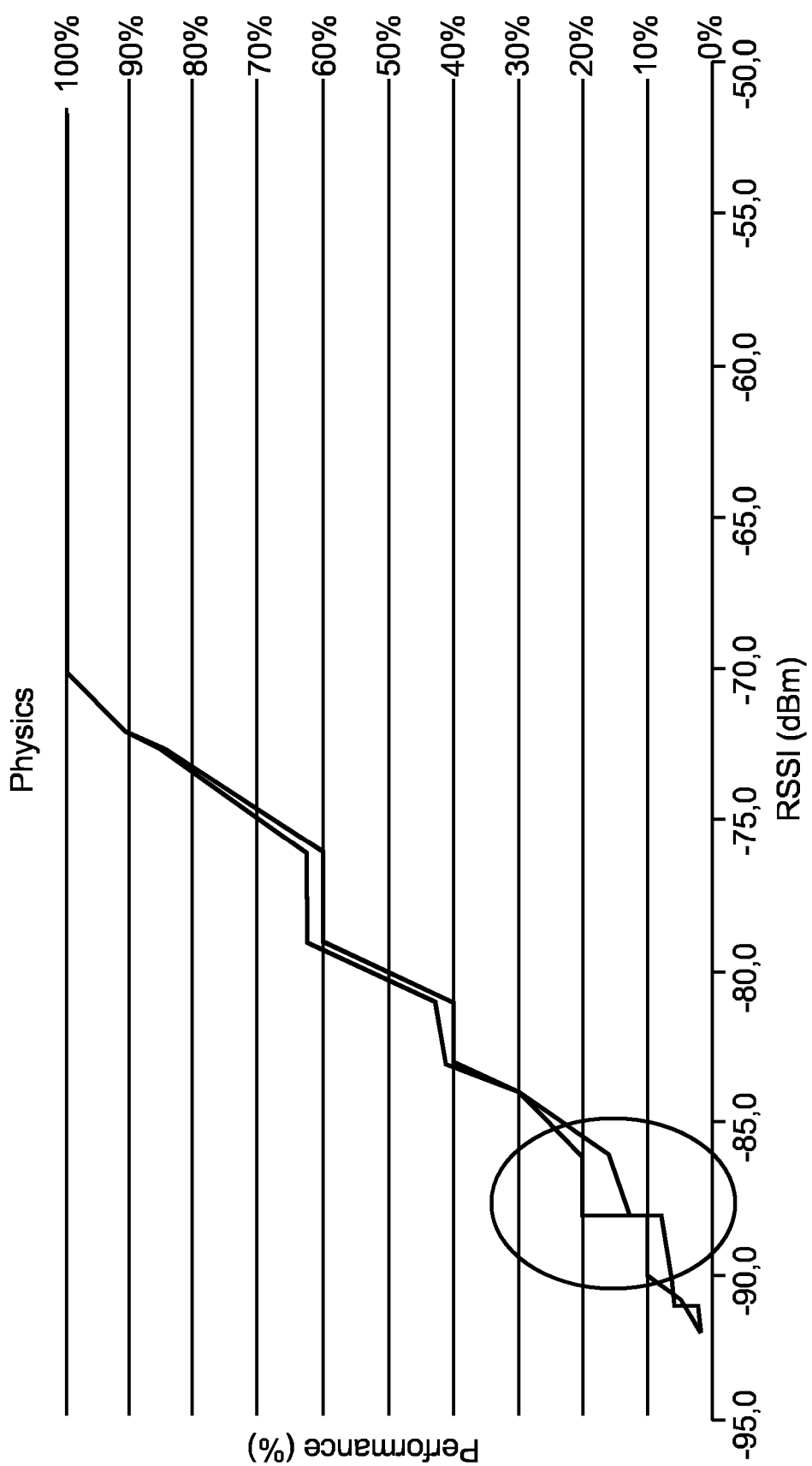

FIG. 4 shows a diagram depicting the performance in percent, related to the PhysLimitsPhyRate 31, as a function of RSSI in dBm. As can be seen, the data rate is essentially unaffected above an RSSI of 70 dBm, but drops rapidly below 70 dBm and reaches zero below 90 dBm. The measured performance, measured layer 2 throughput in percent×correction factor 1.16, is conform with the theoretical performance: PhysLimitsPhyRate 31 in percent based on RSSI and number of observed spatial streams, with the exception of a region below −85 dBm, where there is some deviation.

The maximum available physical layer rate for the transmission between the access point 1 and the station 2, MaxPhyRate 30, as negotiated, can be obtained for example from the FIG. 5 showing a table, which includes the maximum available data rates for the IEEE standards 802.11b, 802.11g and 802.11n as a function of the number of spatial streams (MIMO Configuration), channel bandwidth (20 or 40 MHz), and SGI (Short Guard Interval) enabled or not enabled.

The performance obtained with regard to FIG. 4 has been transformed for the example: IEEE 802.11n with 20 MHz channel bandwidth and two spatial streams and depicted in FIG. 6. The link layer data rate IN in Mb/s is drawn as a function of the RSSI in dBm. For the link layer (OSI Layer 2) rate, a factor of 1.16 has to be taken into account with regard to the maximum obtainable physical layer rate of 130 Mb/s. The curve relates to a packet loss of <1%.

Alternatively, an average of the parameters: Received Signal Strength (RSSI), Modulation rate (PhyRate) and/or the number of Spatial Streams is used, by measuring the parameters under traffic by including a filtering of the parameters, as described below, to calculate the PhysLimitsPhyRate 31.

The second factor defining PhysLimitsPhyRate 31 is related to the possibility to set up multiple spatial streams or not. Depending on the environment, presence or absence of multiple reflections/spatial paths, (de-) correlation of the signal seen by the different receivers. To take this into account, the measured average number of spatial streams is used, as used by the link under traffic.

The following use case variations are possible: Single AP and multiple STAs running the monitoring method:
- The test application runs on multiple devices, e.g. Android devices and on the AP, diagnosing any AP-STA link whereby the diagnosis is performed on any Android device running the test application. As such one can run a test from an Android device running the application. Also. as such one can run a test from anywhere in the home—provided the application has network connectivity—decoupled from the actual devices under test.
- The test application runs on a single e.g. Android device and on the AP and diagnoses any AP-STA link. The fact that a layer 2 test is used and that the AP is gathering 90% of the statistics allows analysis of any WLAN device even if it is not running the test application. The application will know that it is diagnosing a device not running the test application and will compensate for it.

The method can be used therefore as a passive monitoring application monitoring the Wi-Fi performance and informing a user when any of the described problems occur on its Wi-Fi link.

The method, also called here Wi-Fi™ Doctor, consists advantageously of two parts: an application running on client devices (Android, iOS, PC, etc . . . ) and an application running on the gateway (AP). When using both, optimum measurement results are obtained at both ends of the wireless link by reading critical values from the wireless drivers. In particular the following data are considered by the method:

Physics 1: High Path Loss
  Distance/walls between Gateway and Station
  Bathroom/kitchen/metal cupboards (or other metal/water) obstructing radio path
  Invisible construction "details" like metal screed reinforcement mesh, "chicken wire" walls in Victorian houses, reflective window coating, . . .

Physics 2: 11n-only: MIMO multiple spatial streams not OK
  Too difficult to explain to end user.

NON-WLAN interference:—at Transmit-side or at Receiver-side
  Babyphones, analogue TV senders, BlueTooth devices, Microwave Ovens, . . .
  But also: WLAN not recognised as WLAN: (spatially) hidden nodes, WLAN nodes in adjacent overlapping channels
  802.11 MAC (Medium-Access-Layer) incapable of handling efficiently>collapse Congestion: WLAN traffic from neighbouring WLANs
  Bandwidth decreased by sharing the same medium (802.11 MAC in action)
  Slow Stations (11b or just a STA far away from AP) dictate the total bandwidth!

Figure 6:
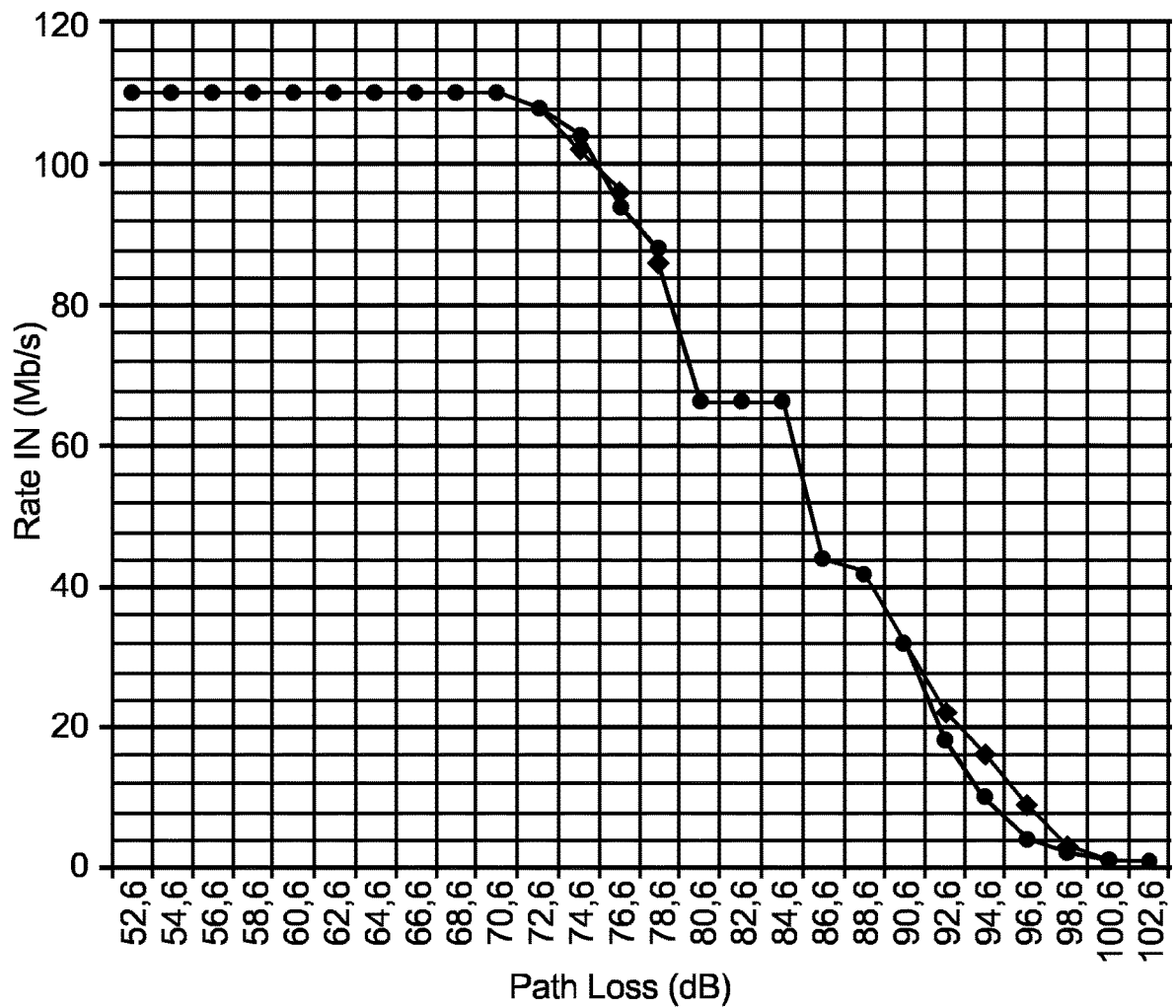

Rate Adaption, see FIG. 6, at the heart of Wi-Fi
  If Signal gets weaker>SINR decreases>Packet Loss>step back to slower physical rates (PhyRates)
  Same happens with increasing Noise or Interference at RX-side
  Rate Adaptation algorithm strives for ~zero packet loss Symptom RSSI
  Indicator for Signal Strength Symptom TrainedPhyRate 32
  =PhyRate when traffic flowing
  Indicator for Signal/Interference&Noise Ratio
  Requires fast (~second) correlation between PhyRate and Rate 802.11n introduces MIMO, multiple Spatial Streams:
System tries to set up multiple spatial streams:–different data streams on transmitting antennas
Orthogonal to Rate Adaptation>separate Symptom: number of spatial streams
Performance "Loss" by failure to use multiple spatial streams:
  Big impact: E.g. 2×2: 50%

Known to be caused by physical effects (Physics) e.g. if no reflections
Shown to be caused by Interference at RX side
Clear Channel Assessment, CCA at the heart of Wi-Fi's CSMA-CA, also known as "Listen before Talk"
  Wi-Fi Transceiver is continuously assessing whether the channel is free.
Symptom: MediumBusy (in percent of time)
Different CCA thresholds
For Wi-Fi frames: very low threshold Efficient "Wait2": frame duration known>Symptom: MediumBusyOtherWiFi 33
For Interference: higher threshold Less efficient: duration not known
The active test includes in particular the following steps:
Step 1: Launches Ping Test from AP to STA, e.g. an Android device
  Goal1: wake up TX and RX members before TX test
  Goal2: solve #spatial streams dilemma by checking RX and TX physical rate (PhyRate) at the AP
  Publish TestRequest 44:
    TestRequest.id=random number, e.g. "PingTestId"
    sourceMAC=MAC address AP
    destinationMAC=MAC address STA RXmember
    type=0 (ping test)
    Duration=5 s
    Packet Size=100 byte
    WMM Class=1 (best effort)
  When test done: retrieve radioStats[testId=PingTestId], remove TestRequest
Step2: Launches Active layer 2 (L2) TX test from AP to Android STA
  Publish TestRequest 44:
    TestRequest.id=random number, e.g. "TXtestId"
    sourceMAC=MAC address AP
    destinationMAC=MAC address targeted STA (Android) RX member
    Type=1 (TX test)
    Duration=10 s
    Packet Size=1500 byte
    WMM Class=1 (best effort)
  When test done: retrieve radioStats[testId=TXtestId], remove TestRequest
Step3: Display categories in percent on graphical user interface (GUI), see also FIG. 7:
  %Physics=(MaxPhyRate 30−PhysLimitsPhyRate 31 (RedBorderPhyRate))/MaxPhyRate 30
    RedBorderPhyRate 31=MAX(PhysLimitsPhyRate 31, TrainedPhyRate 32)
    MaxPhyRate 30 in data model (QDM): AssociatedStation[MACAddress=MAC Android Rxmember AND associated=true].maxNegotiatedPhyRate, TrainedPhyRate in QDM:
  RadioStats[testId=TXtestId AND radio=radioID of AP].APStats[MACAddress=BSSID].AssociatedStationStats[MACAddress=MAC Android Rxmember].trainedPhyRateTX
    PhysLimitsPhyRate 31=(look-up of ReferencePhyRate (RSSI))×TXRXcorFac Look-up table (RSSI>ReferencePhyRate) provided in FIGS. 4, 6
    RSSI in QDM: RadioStats[testId=TXtestId AND radio=radioID of Android RXmember]. STAStats[MACAddress=MAC Android Rxmember].RSSI Blind test: use RadioStats[testId=TXtestId AND radio=radioID of AP]. APStats[MACAddress=BSSID]. AssociatedStationStats[MACAddress=MAC Android Rxmember].RSSI
    TXRXcorFac=max(PINGspatsUL/PINGspatsDL,1)
  %Physics (continued)
    PINGspatsUL in QDM: RadioStats[testId=PingtestId AND radio=radioID of AP]. APStats[MACAddress=BSSID].AssociatedStationStats.[MAC Address=MAC Android Rxmember]. avgSpatialStreamsRX
    PINGspatsDL in QDM: RadioStats[testId=PingtestId AND radio=radioID of AP]. APStats[MACAddress=BSSID].AssociatedStationStats.[MAC Address=MAC Android Rxmember]. avgSpatialStreamsTX
  Look Up of ReferencePhyRate(RSSI) units kbps, e.g. from reference measurements, FIGS. 4, 6
    For 11n 2×2: MIN (MAX ((RSSI+82)*100000/37, 0),100000) i.e. linear between (RSSI=−82 dBm, 0 kbps) and (RSSI=−45 dBm, 100000 kbps), 0 kbps when RSSI<−82 dBm, 100000 kbps when RSSI>−45 dBm
    For 11n 1×1: MIN (MAX (RSSI+82)*60000/23, 0), 60000) i.e. linear between (RSSI=−82 dBm, 0 kbps) and (RSSI=−59 dBm, 60000 kbps), 0 kbps when RSSI<−82 dBm, 60000 kbps when RSSI>−59 dBm
  FEIF=(PhysLimitsPhyRate 31 (RedBorderPhyRate)−TrainedPhyRate)/MaxPhyRate
  %What you get!=MIN (TrainedPhyRate, ThroughputPSon×CorFac)/MaxPhyRate
    CorFac=correction factor to translate L2 DataRate to PhyRate>>experimentally:
      for 11 g CorFac=2
      for 11n (with AMPDU) CorFac is 1.43
    ThroughputPSon in QDM: RadioStats[testId=TXtestId AND radio=radioID of AP].APStats[MACAddress=BSSID].AssociatedStationStats[MACAdd ress=MAC Android Rxmember].dataRateTX
  SharingWiFi=MediumBusyWiFi×TrainedPhyRate/MaxPhyRate−%What you get!
    MediumBusyOtherWiFi in QDM=sum of RadioStats[testId=TXtestId AND radio=radioID of AP].APStats[MACAddress=BSSID].RXTimeFractionOBSS and RadioStats[testId=TXtestId AND radio=radioID of AP].APStats[MACAddress=BSSID].RXTimeFractionIBSS and RadioStats[testId=TXtestId AND radio=radioID of AP].APStats[MACAddress=BSSID].TXTimeFraction
    take into account traffic sent by AP in parallel to Txtest (e.g. to other stations)
    Note: ceiling: 100%−%Physics−%FEIF−%What you get!
  Sleeping=MediumAvailabe×TrainedPhyRate/MaxPhyRate
    MediumAvailable in QDM: RadioStats[testId=TXtestId AND radio=radioID of AP].mediumAvailable
    Note: needed as some power save mechanisms (PS-poll) are not reflected correctly in the parameter "powerSaveTimeFraction" (as the AP is not aware of the exact timings).
    Note: ceiling: 100%−%Physics−%FEIF−%What you get!−%SharingWiFi
  %NEIF=100% −%Physics−%FEIF−%WhatYouGet!−%Sleeping−%SharingWiFi
    Note: ceiling: 0% (i.e. cannot be negative).
  Proposed on GUI in case %FEIF is dominant in test result Publish ScanRequest to AP and STA under test
Radio=Radio id of AP and STA
When the two ScanList are ready: retrieve all ScanListEntry
ScanListEntries with a channel equal to Radio[id of TXMember].channel
If present on the AP's ScanList as wells as on the STA's ScanList>>mark as "Sharing Channel"
If present on the AP's ScanList and not on the STA's ScanList>>mark as "Hidden for STA"
If present on the STA's ScanList and not on the AP's ScanList>>mark as "Hidden for AP"
ScanListEntries with a channel equal to Radio[id of TXMember].channel −3, −2, −1, +1, +2, or +3>>mark as "Overlapping"
Display only the marked ScanListEntries For calculating losses of a wireless link of a Wi-Fi node between a customer premises equipment device and a station in a correct manner, it is in particular important to take samples of one or several of the following parameters in a defined time interval, e.g. every second: Received Signal Strength (RSSI), Modulation rate (Physical Rate) and/or the number of spatial streams used for a given Wi-Fi link, and calculating an average for that parameters by including a filtering of said parameters. The filtering is used in particular to filter out non-data frames, e.g. control frames, which do not contribute to the Wi-Fi transmission rate.

Figure 7:
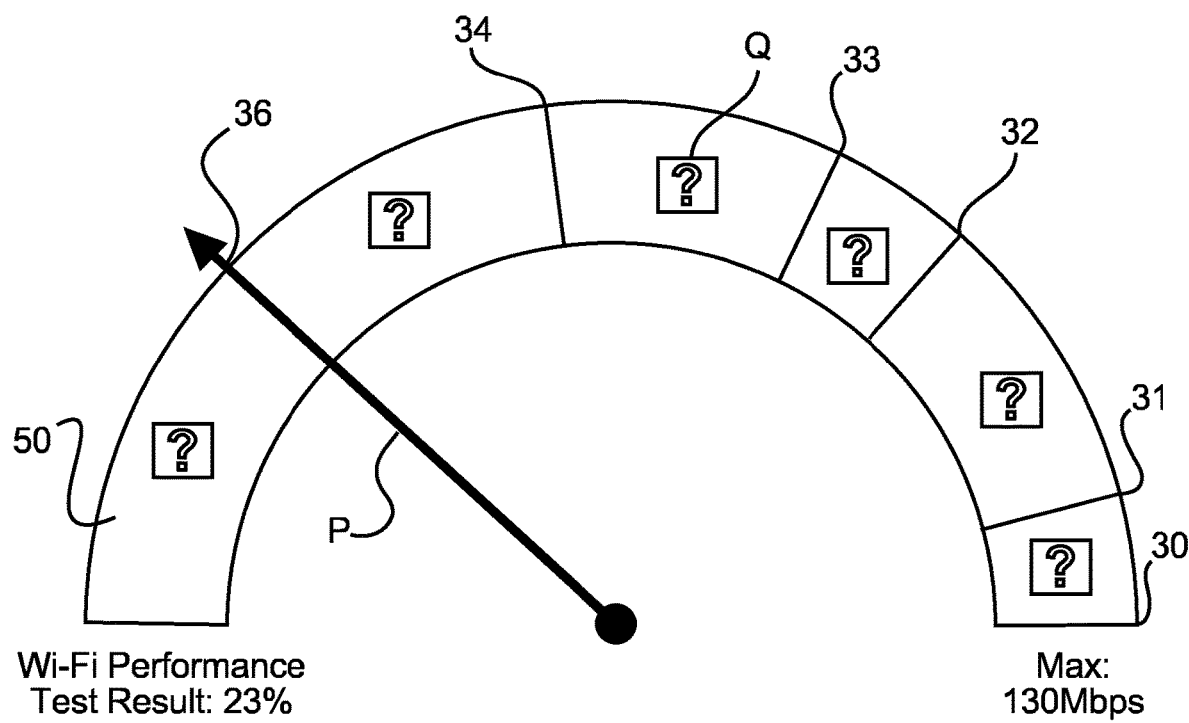

The obtained results can be displayed for a user on a display of his station 2 by the test application 40 for example as consecutive blocks forming a semi-circle, as shown in FIG. 7. The data rates as explained with regard to FIG. 2 define the length of each block. A pointer P visualizes the finally attainable data rate 36, which is in this embodiment 23% of the theoretically available data rate of 130 MB/s. Each of the blocks include a question mark Q, which can be selected by the user for example by using a mouse or a touchpad; and by selecting a question mark Q, the user is informed about the problem which causes the throughput loss leading to the contribution of this block and gives an advice for the user, how he can improve the situation. In case of the question mark Q of the block 50, the user is informed that the obtained data rate during the test was only 28 MB/s, 23% of the theoretically maximum rate of 130 MB/s.

Also other embodiments of the invention may be utilized by one skilled in the art without departing from the scope of the present invention. The method as described may be used in particular for all kinds of access points and stations using a wireless transmission, e.g. Wi-Fi. The invention resides therefore in the claims herein after appended.

The invention claimed is:

1. A method for analyzing performance of a wireless node, the method comprising:
acquiring samples of a wireless link, each sample comprising a transmission rate (TxRate) or a receive rate (RxRate) of the wireless link, and a plurality of parameters of the wireless link that include Received Signal Strength (RSSI), modulation rate (Physical Layer Rate), and number of spatial streams used for the wireless link, wherein the TxRate or the RxRate is indicative of data traffic flowing over the wireless link;
filtering the samples of the wireless link that meet a threshold of the TxRate or RxRate of the wireless link;
averaging at least one parameter of the plurality of parameters of the wireless link of the filtered samples;
calculating a maximum possible data rate for the wireless link on the basis of the averaged at least one parameter of the wireless link; and
reporting the maximum possible data rate for the wireless link to a user.

2. The method of claim 1, wherein the threshold for the filtering is adjusted such that non-data frames are filtered out.

3. The method of claim 1, wherein the samples are taken by passive monitoring during which a data transmission is monitored between an access point and a station.

4. The method of claim 1, wherein the TxRate and the RxRate are physical layer rates.

5. The method of claim 1, wherein a scan list is established including all neighboring WLAN nodes being recognized when an access point or a station scans WLAN channels, to determine near-end and/or far-end interference.

6. The method of claim 1, wherein the TxRate or RxRate of the wireless link and the plurality of parameters of the wireless link are sampled at the same time.

7. The method of claim 1, wherein sampling occurs in predetermined increments of time.

8. The method of claim 1, wherein each sample is synchronized in time.

9. A circuit for analyzing the performance of a wireless link, the circuit comprising a processor and an antenna, wherein the processor and the antenna are configured for:
acquiring samples of a wireless link, each sample comprising a transmission rate (TxRate) or a receive rate (RxRate) of the wireless link, and a plurality of parameters of the wireless link that include Received Signal Strength (RSSI), modulation rate (Physical Layer Rate), and number of spatial streams used for the wireless link, wherein the TxRate or the RxRate is indicative of data traffic flowing over the wireless link;
filtering the samples of the wireless link that meet a threshold of the TxRate or RxRate of the wireless link;
averaging at least one parameter of the plurality of parameters of the wireless link of the filtered samples;
calculating a maximum possible data rate for the wireless link on the basis of the averaged at least one parameter of the wireless link; and
reporting the maximum possible data rate for the wireless link to a user.

10. The circuit of claim 9, wherein the threshold for the filtering is adjusted such that non-data frames are filtered out.

11. The circuit of claim 9, wherein the samples are taken by passive monitoring during which a data transmission is monitored between an access point and a station.

12. The circuit of claim 9, wherein the TxRate and the RxRate are physical layer rates.

13. The circuit of claim 9, wherein a scan list is established including all neighboring WLAN nodes being recognized when an access point or a station scans WLAN channels, to determine near-end and/or far-end interference.

14. The circuit of claim 9, wherein the TxRate or RxRate of the wireless link and the plurality of parameters of the wireless link are sampled at the same time.

15. The circuit of claim 9, wherein sampling occurs in predetermined increments of time.

16. The circuit of claim 9, wherein each sample is synchronized in time.

17. A method for analyzing performance of a wireless node, the method comprising:
acquiring a plurality of samples of a wireless link,
wherein each sample of the plurality of samples includes statistics including a data rate measurement of the wireless link acquired from an access point and a measurement of a plurality of parameters of the wireless link acquired from a station,
wherein the plurality of parameters of the wireless link includes a Received Signal Strength (RSSI), modulation rate (Physical Layer Rate), and a number of spatial streams used for the wireless link;
filtering out each sample that does not meet a data rate measurement threshold from the plurality of samples of the wireless link to generate a subset of samples;
averaging each measurement of the plurality of parameters of the subset of samples to generate an average measurement for each parameter;
calculating a maximum possible data rate for the wireless link based on one of the average measurements; and
reporting the maximum possible data rate for the wireless link to a user.

18. The method of claim 17, wherein the statistics of each sample from the access point and the station are synchronized in time.

* * * * *